(12) United States Patent
Eldar et al.

(10) Patent No.: US 10,242,294 B2
(45) Date of Patent: Mar. 26, 2019

(54) TARGET OBJECT CLASSIFICATION USING THREE-DIMENSIONAL GEOMETRIC FILTERING

(71) Applicant: INTEL CORPORATION, Santa Clara, CA (US)

(72) Inventors: Avigdor Eldar, Jerusalem (IL); Ovadya Menadeva, Modiin (IL); Kfir Viente, Jerusalem (IL)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/582,864

(22) Filed: May 1, 2017

(65) Prior Publication Data

US 2018/0314911 A1    Nov. 1, 2018

(51) Int. Cl.
*G06K 9/00* (2006.01)
*G06K 9/62* (2006.01)
*G06K 9/44* (2006.01)
*G06T 7/194* (2017.01)

(52) U.S. Cl.
CPC ......... *G06K 9/627* (2013.01); *G06K 9/00375* (2013.01); *G06K 9/44* (2013.01); *G06K 9/626* (2013.01); *G06T 7/194* (2017.01); *G06T 2207/20081* (2013.01)

(58) Field of Classification Search
CPC ..................... G06T 7/194; G06T 2207/20081
See application file for complete search history.

(56) References Cited

U.S. PATENT DOCUMENTS

| | | | |
|---|---|---|---|
| 9,858,496 B2 * | 1/2018 | Sun ...................... | G06K 9/4671 |
| 2011/0311129 A1 * | 12/2011 | Milanfar ............. | G06K 9/00335 |
| | | | 382/154 |
| 2012/0313955 A1 * | 12/2012 | Choukroun ............. | G06T 19/00 |
| | | | 345/582 |
| 2017/0372174 A1 * | 12/2017 | Wshah ................. | G06K 9/6256 |
| 2018/0232471 A1 * | 8/2018 | Schissler ............. | G06F 17/5009 |

* cited by examiner

*Primary Examiner* — Oneal R Mistry
(74) *Attorney, Agent, or Firm* — International IP Law Group, P.L.L.C.

(57) ABSTRACT

An example apparatus for classifying target objects using three-dimensional geometric filtering includes a patch receiver to receive patches with objects to be classified. The apparatus also includes a geometric filter to filter out patches including objects with sizes outside a target range using three dimensional geometry to generate filtered patches. The apparatus further includes a background remover to remove background pixels from the filtered patches to generate preprocessed patches. The apparatus includes a classification score calculator to calculate a classification score for each of the preprocessed patches.

16 Claims, 7 Drawing Sheets

100

400

TARGET OBJECT CLASSIFICATION USING THREE-DIMENSIONAL GEOMETRIC FILTERING

BACKGROUND

Various object classifiers may be used to classify objects in images. For example, the classified objects may be hands, heads, people, cars, etc. In some examples, neural networks such as convolutional neural networks can be trained to classify objects based on training sets of images. The trained convolutional neural networks may then automatically classify the objects in received images.

The classifications may then be used to distinguish detect objects in images. For example, the images may be frames taken by a video camera.

BRIEF DESCRIPTION OF THE DRAWINGS

The same numbers are used throughout the disclosure and the figures to reference like components and features. Numbers in the 100 series refer to features originally found in FIG. 1; numbers in the 200 series refer to features originally found in FIG. 2; and so on.

DESCRIPTION OF THE EMBODIMENTS

Figure 1:
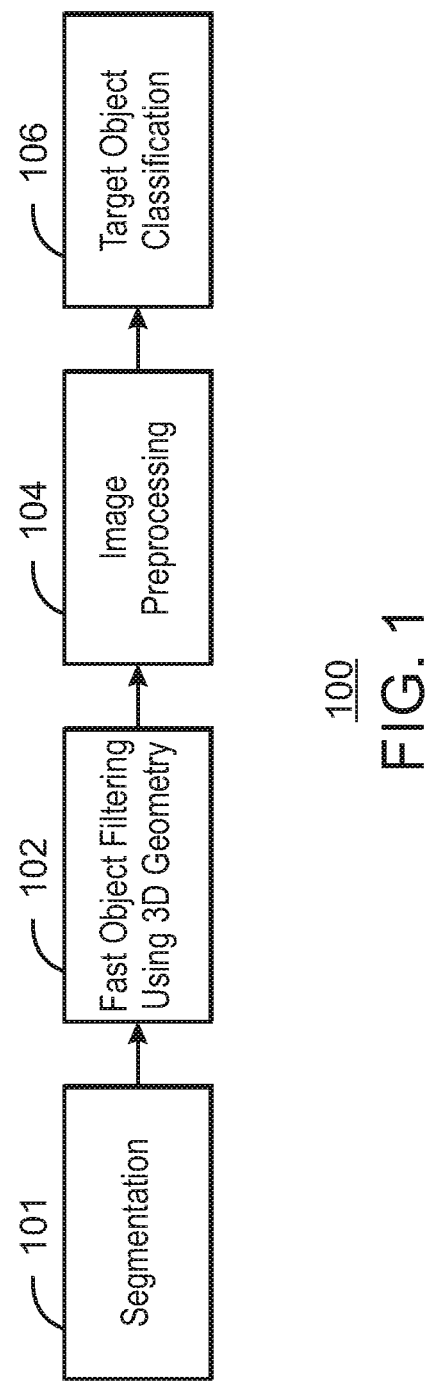
FIG. 1 is a block diagram illustrating an example processing pipeline for classifying target objects in images using three-dimensional geometric filtering.

As discussed above, object classifiers may be used to detect objects in images. For example, accurate hand detection may be used in the process of high level understanding of hand gesture and movement. In the context of a virtual reality (VR) application, a hand classification module may operate in both a highly limited time budget of 1-2 milliseconds and also provide very high accuracy results to minimize hand tracking loss. For example, the accuracy of the results may have a recall of greater than 99.8%. However, generic object classification techniques may not work within the 2 millisecond limit that is reasonable for a real-time application running at 60 frames per second (FPS). Moreover, some techniques that do work in real time may not exhibit a high recall rate of at least 99.8%.

Moreover, classifying hands in images in particular may be challenging due to the changing shapes involved. Hands have many moving parts and thus may be particularly challenging to classify. For example, hands may appear very differently from various perspectives depending on hand gestures or postures.

The present disclosure relates generally to techniques for classifying target objects in images. Specifically, the techniques described herein include an apparatus, method and system for classifying target objects in images using three-dimensional geometric filtering. For example, the target objects may be objects that are particularly difficult to classify, such as human hands. An example apparatus includes a patch receiver to receive patches with objects to be classified. As used herein, a patch refers to a region of an image identified as including an object. The apparatus includes a geometric filter to filter out patches including objects with sizes outside a target range using three dimensional geometry to generate filtered patches. The apparatus further includes a background remover to remove background pixels from the filtered patches to generate preprocessed patches. The apparatus also includes a classification score calculator to calculate a classification score for each of the preprocessed patches. The apparatus further includes a score average to average classification scores received over a predetermined time for each of the preprocessed patches. The apparatus may also include a target object detector to detect a target object in response to detecting a classification score exceeding a threshold score. The apparatus may also include a virtual target object displayer to display a virtual target object based on a preprocessed patch exceeding a threshold classification score.

The techniques described herein thus enable accurate and real time detection of target objects, such as human hands. For example, the detected target objects can be displayed in real time in virtual reality environments or used in any other real time applications. Thus, the techniques described herein may enable high recall rates while maintaining low latency times. In addition, the techniques described herein are both light-weight and robust. Therefore, the techniques described herein may enable efficient processing of images to detect the target objects. In addition, the techniques described herein may allow convolutional neural networks to be used without being specifically trained for background noise. In some examples, less input variability may enable dramatic reduction of the CNN module complexity. For example, the background noise removal described herein may allow the convolutional neural networks to be trained and classify objects more efficiently without needing to be also trained to detect background noise.

FIG. 1 is a block diagram illustrating an example processing pipeline for classifying target objects in images using three-dimensional geometric filtering. The example system is referred to generally by the reference number 100 and can be implemented in the computing device 600 below in FIG. 6 using the methods 200-400 of FIGS. 2-4 below.

The example system 100 includes a segmentation stage 101, a fast object filtering stage 102 using a three-dimensional geometry, an image preprocessing stage 104, and a target object classification stage 106. In some examples, the target object classification stage 106 may be implemented using a neural network, such as a convolutional neural network (CNN). In some examples, the neural network may be a deep neural network. For example, the neural network used may be the ResNet residual network for image recognition.

As shown in FIG. 1, the segmentation stage 101 may receive depth images and generated corresponding masks. For example, the masks may correspond to objects in the depth images. The fast object filtering stage 102 may receive patches and masks as input and output filtered patches. For example, each of the received patches may include an infrared image and a depth image. For example, the infrared images may be black and white images representing detected values of infrared light. The pixels of the depth images may represent distance values from the camera to objects represented by the pixels. In some examples, the fast object filtering stage 102 may filter out patches including objects outside a particular geometric range using bounding boxes as described in greater detail according to the method 200 of FIG. 2 below. The image preprocessing stage 104 may receive the filtered patches as input and output preprocessed patches. For example, the image preprocessing stage 104 may remove background noise using depth information as described in greater detail with respect to the method 300 of FIG. 3 below. The target object classification stage 106 may receive the preprocessed patches as input and generate classification scores for each of the preprocessed patches. For example, the classification scores may indicate a probability that each patch corresponds to a target object.

In some examples, a convolutional neural network may be used to implement the target object classification stage 106. For example, the convolutional neural network may include a plurality of layers, with output sizes, channels, and operations as shown in the table below. In some examples, each of the layers may have 3×3 kernels with varying numbers of channels as shown below.

| Layer name | Output size | Channels | Operation |
| --- | --- | --- | --- |
| conv1_x | 48 × 48 | 8 | [3 × 3, 8] × 2 |
| conv2_x | 24 × 24 | 16 | [3 × 3, 16] × 2 |
| conv_3_x | 12 × 12 | 32 | [3 × 3, 32] × 2 |
| conv4_x | 6 × 6 | 64 | [3 × 3, 64] × 2 |
| Fully-Connected | 1 × 1 | | Average pool, 2-D fully-connected |

The fully connected layer may include neurons that have full connections to all activations in the previous layer. The fully-connected layer may take an input volume (for example conv4_x) and output a two-dimensional vector. In some examples, the number of classes that the classifier has to choose from may be two classes. For example, the classes may be $No_{13}$ Hand indicated by a value of 0 or Hand indicated by a value of 1. In some examples, each value in the two-dimensional vector may represent the probability of a class given two classes. The fully connected layer may look at the output of the previous layer and determine which features most correlate to a particular class. For example, the output of the previous layer may represent activation maps of high level features. The fully-connected layer may then determine which high level features most strongly correlate to a certain class. In some examples, the fully-connected layer and may have specific weights so that when it computes products between the weights and the previous layer, and the fully-connected layer can output probabilities for the classes. For example, the output probabilities may be a probability Hand indicating probability of the object being a hand and probability $No_{13}$ hand indicating a probability of an object not being a hand.

In some examples, the output classification scores may be used to detect target objects. For example, target objects may be detected in response to detecting classifications scores above a particular threshold score. In some examples, the detected target objects may be used in virtual reality applications as discussed in greater detail below.

The diagram of FIG. 1 is not intended to indicate that the example processing pipeline 100 is to include all of the components shown in FIG. 1. Rather, the example processing pipeline 100 can be implemented using fewer or additional components not illustrated in FIG. 1 (e.g., additional stages, filters, images, etc.).

Figure 2:
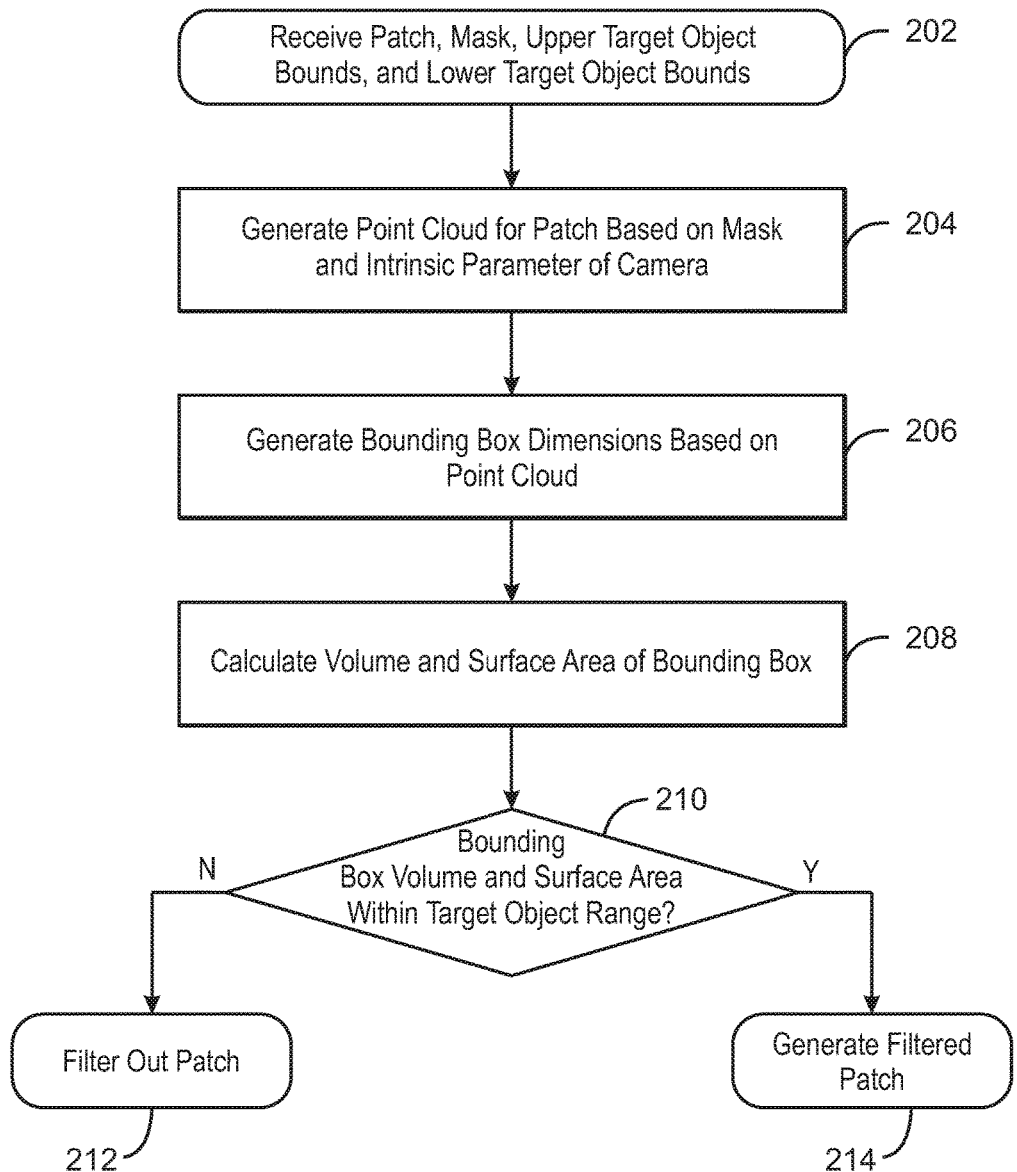
FIG. 2 is a flow chart illustrating an example method for three-dimensional geometric filtering.

FIG. 2 is a flow chart illustrating an example method for three-dimensional geometric filtering. The example method is generally referred to by the reference number 200 and can be implemented in the processing pipeline of FIG. 1 above or the computing device 600 of FIG. 6 below.

At block 202, the processor receives a patch, a mask, upper target object bounds, and lower target object bounds. In some examples, the patch may include a single object. For example, the patch may include an infrared (IR) image and a depth image including the object. In some examples, two objects may be merged during tracking if they are tracked from a previous frame from the same single object. In some examples, the mask may be a binary image where pixels having a value of 255 are object pixels and pixels with a value of 0 are background pixels. For example, the object boundary may be based on a depth map using background removal. In some examples, the upper target object bounds and lower target object bounds may be upper and lower size bounds for objects such as hands based on typical object size. In some examples, the upper target and lower target bounds may be received from a target object ground-truth database. For example, if the target object to be classified is a human hand, then the upper bounds and lower bounds may be based on hand statistics from a Hand Ground-Truth Database. In some examples, the mask may be received from a segmentation process. For example, the mask may be generated using the segmentation process 102 of FIG. 1 above or the segmentation process of FIGS. 5A-5F below.

At block 204, the processor generates a point cloud for the patch based on the mask and intrinsic parameter of camera. For example, the generated point cloud may be a set of coordinates corresponding to a segmented object in the patch.

At block 206, the processor generates dimensions for a bounding box based on the point cloud. For example, the bounding box may be sized to fit the point cloud entirely within its dimensions. In some examples, a principal component analysis (PCA) can be used to compute the three dimensional bounding box. For example, an orthogonal transformation may be used to convert a set of observations of possibility correlated variables into a set of values of linearly uncorrelated variables called principal components.

At block 208, the processor calculates a volume and a surface area of the bounding box. For example, the volume and the surface area of the bounding box may be calculated based on the dimensions of the bounding box.

At decision diamond 210, the processor determines whether the bounding box volume and bounding box surface area are within target object range. For example, the target object range may include a lower bound threshold for the bounding box volume and an upper bound threshold for the bounding box volume. The target object range may also include a lower bound threshold for the bounding box surface area and an upper bound threshold for the bounding box surface area. In some examples, if both the volume and the surface area of the bounding box are not higher than the lower bound thresholds and lower than the upper bound thresholds, then the method may continue at block 212. In some examples, if both the volume and the surface area of the bounding box are higher than the lower bound thresholds and lower than the upper bound thresholds, then the method may continue at block 214. At block 212, an object associated with the bounding box may be filtered out. At block 214, a filtered patch may be generated based on the patch associated with the bounding box.

This process flow diagram is not intended to indicate that the blocks of the example method 200 are to be executed in any particular order, or that all of the blocks are to be included in every case. Further, any number of additional blocks not shown may be included within the example method 200, depending on the details of the specific implementation. In some examples, noise smoothing techniques may also be applied at one or more of the blocks. For example, noise smoothing may be applied at block 206 in generating dimensions for the bounding box. In some examples, outliers may be removed from a projected PCA-XYZ space. For example, outliers within three standard deviations of a mean may be removed from the projected space.

Figure 3:
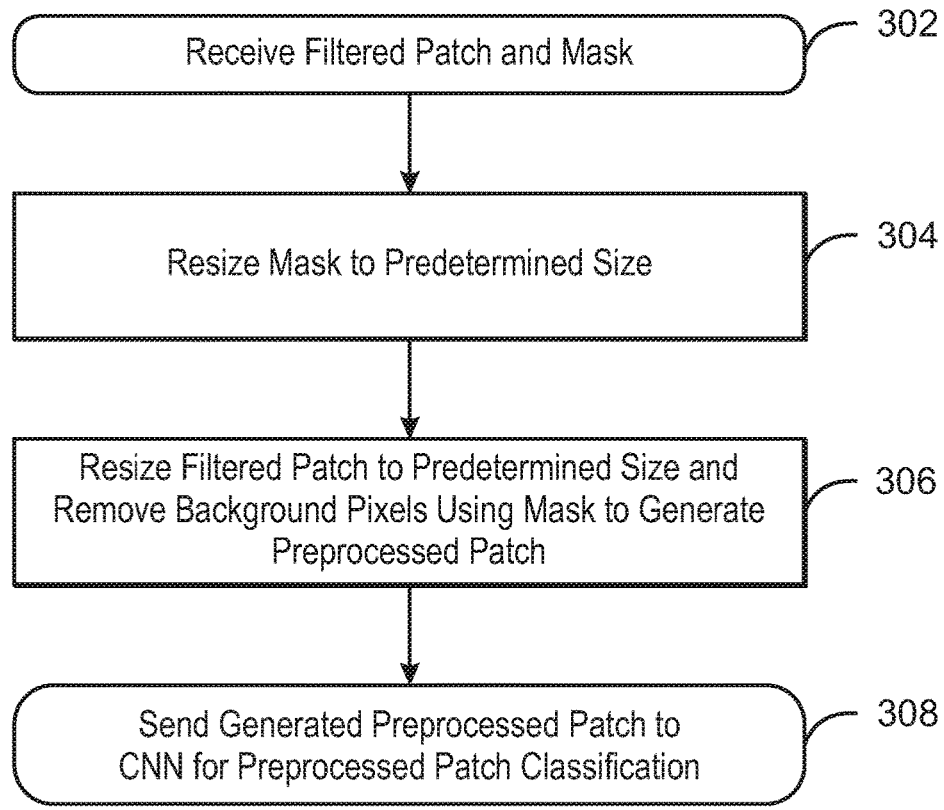
FIG. 3 is a flow chart illustrating a method for preprocessing filtered images.

FIG. 3 is a diagram illustrating an example method for preprocessing filtered images. The example method is generally referred to by the reference number 300 and can be implemented in the processing pipeline 100 of FIG. 1 above, or the computing device 600 of FIG. 6 below or the computer readable media 700 of FIG. 7 below. For example, the method 300 may be implemented in the image preprocessing stage 104 of the processor pipeline 100, background remover 634 of computing device 600 or the background remover module 710 of the computer readable media 700 of FIG. 7 below.

At block 302, the processor receives a filtered patch and a mask. For example, the filtered patch may be an infrared (IR) sub image referred to herein as a region of interest (ROI). The mask may be binary image where pixels having a value of 255 are object pixels and pixels with a value of 0 are background pixels. In some examples, the mask may be obtained from depth image information corresponding to an object in the filtered patch. For example, the mask may correspond to the generated seed image of FIG. 5F below and may have been generated using the segmentation process discussed with regards to FIGS. 5A-5F.

At block 304, the processor resizes the mask to a predetermined size. For example, the predetermined size may be 48×48 pixels.

At block 306, the processor resizes the filtered patch to the predetermined size and removes background pixels using the mask to generate a preprocessed patch. For example, all non-masked pixels in the resized filtered patch may be set to a value of zero. Thus, background pixels outside of the mask may be removed. The preprocessed patch may include a masked depth image.

At block 308, the processor sends the generated preprocessed patch to a CNN for preprocessed patch classification. For example, the CNN may be a trained object classifier.

This process flow diagram is not intended to indicate that the blocks of the example method 300 are to be executed in any particular order, or that all of the blocks are to be included in every case. Further, any number of additional blocks not shown may be included within the example method 300, depending on the details of the specific implementation. For example, noise smoothing techniques may also be applied at one or more of the blocks.

Figure 4:
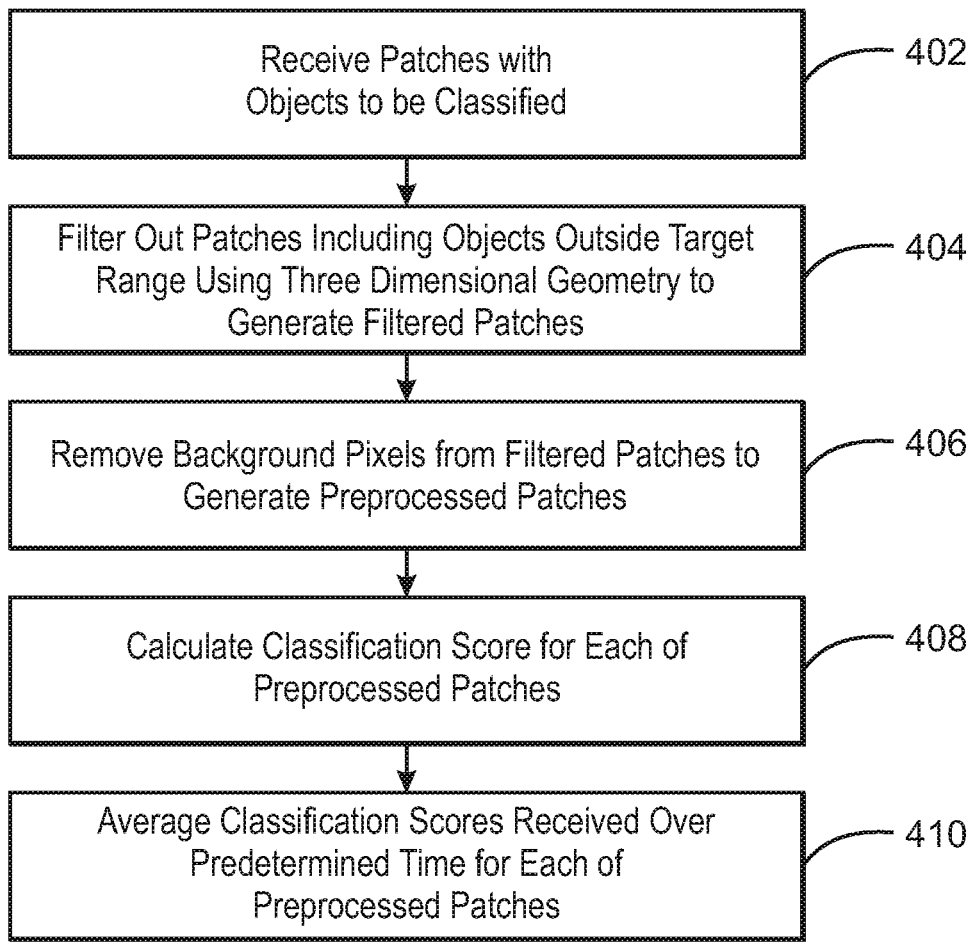
FIG. 4 is a flow chart illustrating a method for classifying target objects in images using three-dimensional geometric filtering.

FIG. 4 is a flow chart illustrating a method for classifying target objects in images using three-dimensional object filtering. The example method is generally referred to by the reference number 400 and can be implemented in the object detector 628 of the computing device 600 of FIG. 6 below, or the computer readable media 700 of FIG. 7 below.

At block 402, the processor receives patches with objects to be classified. In some examples, the patches may include depth images and infrared images. For example, the infrared images may be received from a depth camera and may correspond to rectangular patches indicating detected objects that are not classified. In some examples, the processor may also receive masks generated using a segmentation process. For example, the masks may be generated using the segmentation processor described with respect to FIGS. 5A-5F below. Each patch may include an object to be detected. For example, the object may be a hand.

At block 404, the processor filters out patches including objects with sizes outside a target range using three dimensional geometry to generate filtered patches. In some examples, the processor can calculate a bounding box for each patch using a principal component analysis and compare a volume and a surface area of the bounding box for each patch to a lower bounding box threshold and a higher bounding box threshold. For example, the processor can calculate a lower bounding box threshold and a higher bounding box threshold based on a plurality of values received from an object database. The values may indicate the size of sample objects. For example, objects may be filtered out using the fast object filtering stage 102 or the three-dimensional geometric filtering method 200 of FIG. 2 above. In some examples, the processor can apply smoothing to generate dimensions for a bounding box.

At block 406, the processor removes background pixels from the filtered patches to generate preprocessed patches. For example, the processor may process the filtered patches using the image preprocessing stage 104 of FIG. 1 above or the method 300 of FIG. 3 above. For example, the background pixels can be removed based on the mask generated using the segmentation process discussed with regards to FIGS. 5A-5F below. For example, all non-masked pixels in the depth image may be set to a value of zero. The resulting image is a masked depth image.

At block 408, the processor calculates classification scores for each of the preprocessed patches. In some examples, the classification scores can be calculated using a trained CNN classifier. For example, the CNN classifier may have been trained to detect target objects such as hands in patches. The classification scores may thus indicate a probability that a patch contains an object that is a target object, such as a hand.

At block 410, the processor averages the classification scores over a predetermined time for each of the preprocessed patches. For example, classification scores for each of a predetermined number of preprocessed patches may be averaged. In some examples, the classification scores can be used to select candidates. The selected candidates may then be sent to an object classifier, such as a hand classifier.

This process flow diagram is not intended to indicate that the blocks of the example method 400 are to be executed in any particular order, or that all of the blocks are to be included in every case. Further, any number of additional blocks not shown may be included within the example method 400, depending on the details of the specific implementation. In some examples, noise smoothing techniques may also be applied at one or more of the blocks. For example, noise smoothing may be applied at block 206 in generating dimensions for the bounding box.

FIGS. 5A, 5B, 5C, 5D, 5E, and 5F illustrate an example segmentation of a depth image. The images of FIGS. 5A, 5B, 5C, 5D, 5E, and 5F are generally references using reference numbers 500A, 500B, 500C, 500D, 500E, and 500F, respectively. The example images 500A, 500B, 500C, 500D, 500E, and 500F, may be generated using the background remover 634 of the computing system 600 below or the background remover module 710 of the computer readable media 700 of FIG. 7 below.

In FIG. 5A, a depth image 500A is shown including background 502 and a target object 504. For example, the target object of FIG. 5A is a hand. The image 500A may be a depth image with each pixel value containing a distance from the camera in meters. For example, 0.1 may be 10 centimeters. In FIG. 5B, an erosion filter can be applied to the image of 500A to generate processed image 500B. For example, each pixel of the depth image 500A may be eroded based on the minimum function of the pixel and its neighboring pixels. In FIG. 5C, an image of difference 500C can be generated by calculating a gradient over the depth image. For example, the image of difference 500C can be generated by subtracting the processed image 500B from the depth image 500A. In FIG. 5D, a seed image 500D including seeds 508 can be generated by setting all pixels with a value greater than a threshold value to zero. For example, the seed image 500D may be a binary image. In FIG. 5E, a labeled seed image 500E is generated by labeling seeds 508 with labels to generate labeled seeds 510. For example, the labeled seed image 500E may be generated using a labeling process of the seed image 500D according to distance criteria of the depth differences of image of difference 500C. In some examples, the labeled seeds may be color coded to distinguish between components. For example, each component may be assigned a unique identifier (ID) as a label. In FIG. 5F, the labeled seeds 510 are expanded to generate expanded seeds 512. For example, the labeled seeds can be expanded by attaching non-seed pixels to their closest seed in a geodesic manner. Thus, a seed image 500F of the labeled seed image 500E may be generated.

Figure 5:
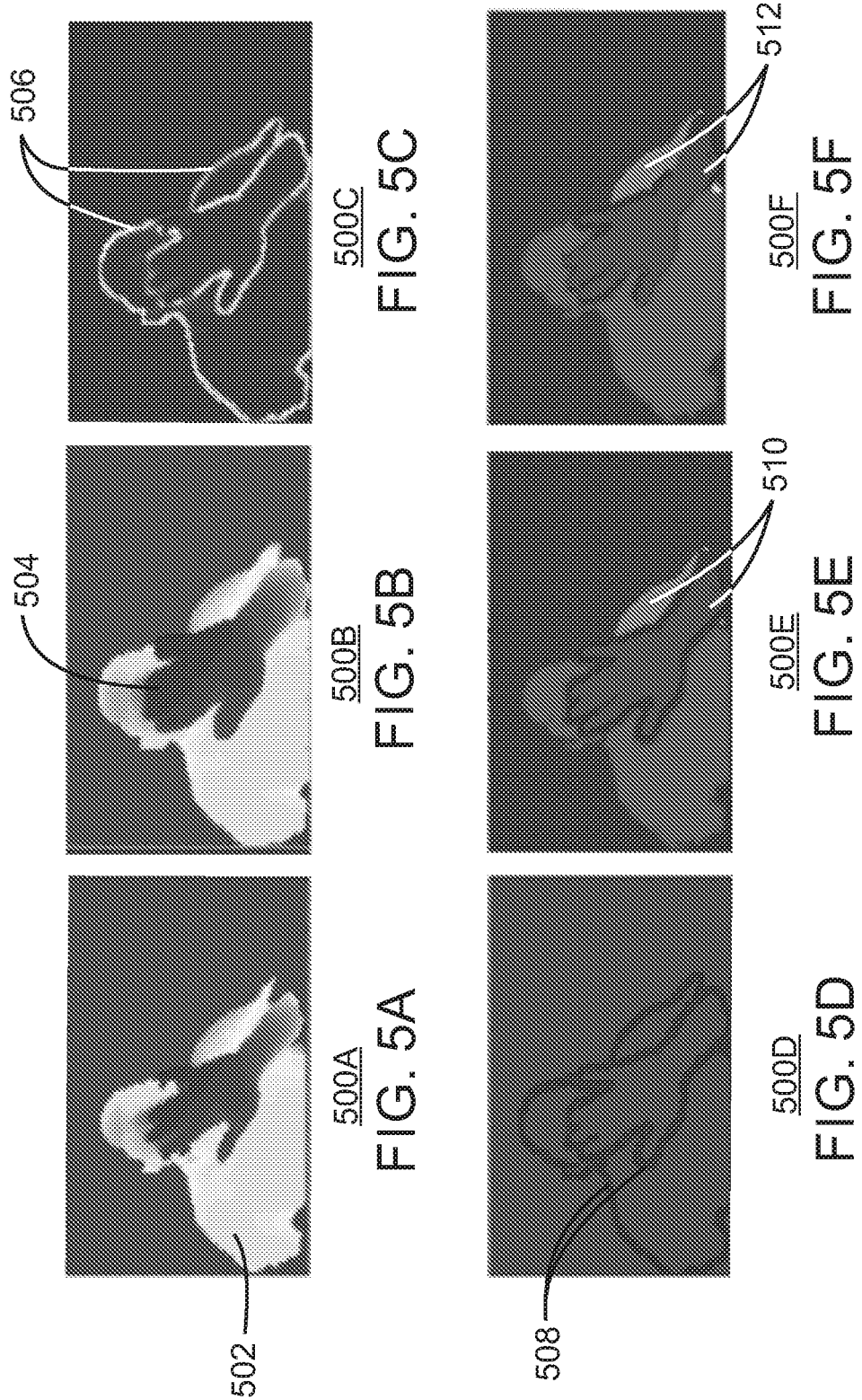
FIGS. 5A, 5B, 5C, 5D, 5E, and 5F illustrate an example segmentation of a depth image.

The diagram of FIG. 5 is not intended to indicate that the example images 500A, 500B, 500C, 500D, 500E, and 500F, are to include all of the components shown in FIG. 5. Rather, the example images 500A, 500B, 500C, 500D, 500E, and 500F, can be generated including fewer or additional components not illustrated in FIG. 5 (e.g., additional objects, seeds, labels, etc.).

Figure 6:
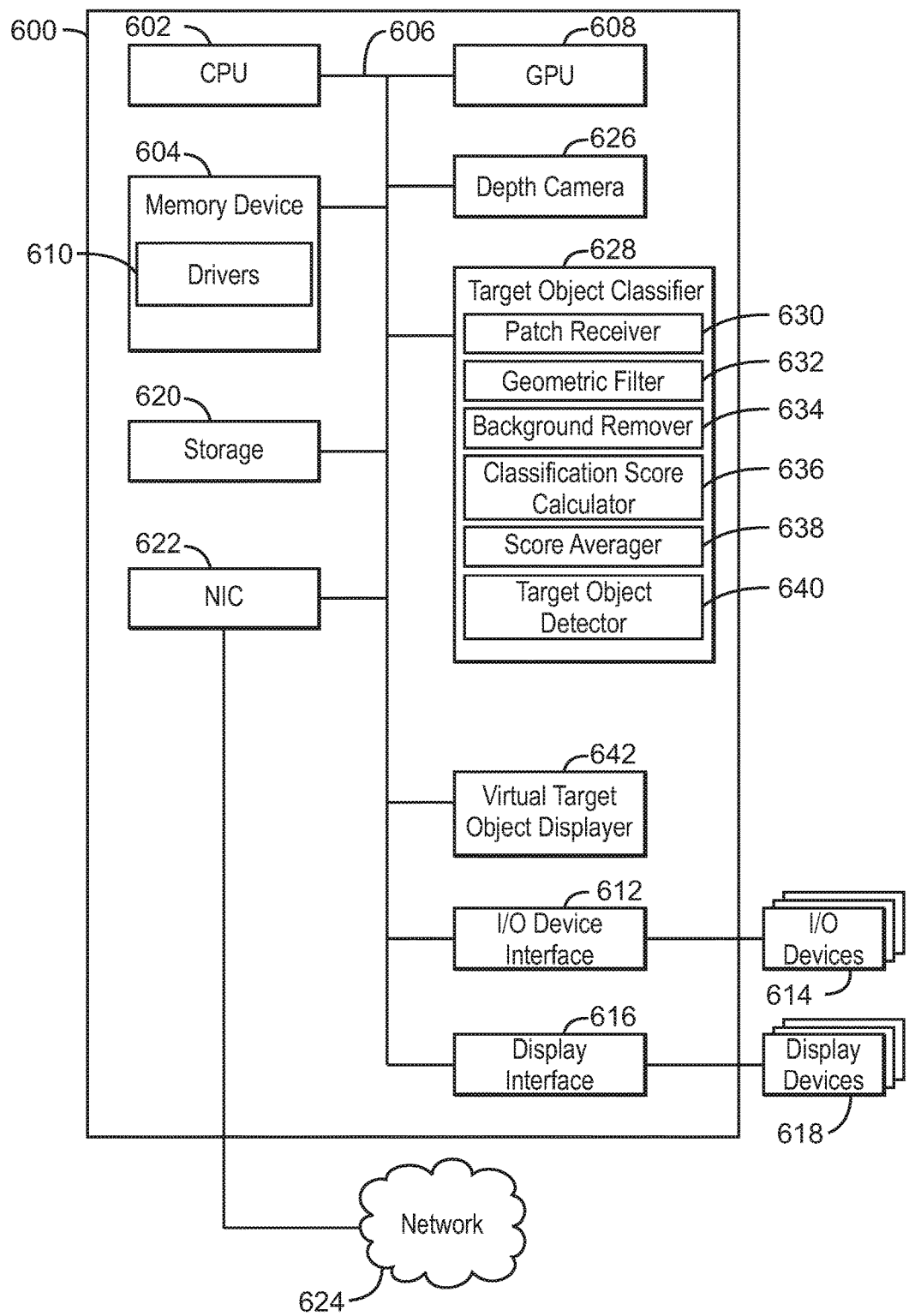
FIG. 6 is block diagram illustrating an example computing device that can classify target objects in images using three-dimensional geometric filtering.

Referring now to FIG. 6, a block diagram is shown illustrating an example computing device that can classify target objects in images using three-dimensional geometric filtering. The computing device 600 may be, for example, a laptop computer, desktop computer, tablet computer, mobile device, or wearable device, among others. In some examples, the computing device 600 may be a smart camera or a digital security surveillance camera. The computing device 600 may include a central processing unit (CPU) 602 that is configured to execute stored instructions, as well as a memory device 604 that stores instructions that are executable by the CPU 602. The CPU 602 may be coupled to the memory device 604 by a bus 606. Additionally, the CPU 602 can be a single core processor, a multi-core processor, a computing cluster, or any number of other configurations. Furthermore, the computing device 600 may include more than one CPU 602. In some examples, the CPU 602 may be a system-on-chip (SoC) with a multi-core processor architecture. In some examples, the CPU 602 can be a specialized digital signal processor (DSP) used for image processing. The memory device 604 can include random access memory (RAM), read only memory (ROM), flash memory, or any other suitable memory systems. For example, the memory device 604 may include dynamic random access memory (DRAM).

The memory device 604 can include random access memory (RAM), read only memory (ROM), flash memory, or any other suitable memory systems. For example, the memory device 604 may include dynamic random access memory (DRAM). The memory device 604 may include device drivers 610 that are configured to execute the instructions for device discovery. The device drivers 610 may be software, an application program, application code, or the like.

The computing device 600 may also include a graphics processing unit (GPU) 608. As shown, the CPU 602 may be coupled through the bus 606 to the GPU 608. The GPU 608 may be configured to perform any number of graphics operations within the computing device 600. For example, the GPU 608 may be configured to render or manipulate graphics images, graphics frames, videos, or the like, to be displayed to a user of the computing device 600.

The memory device 604 can include random access memory (RAM), read only memory (ROM), flash memory, or any other suitable memory systems. For example, the memory device 604 may include dynamic random access memory (DRAM). The memory device 604 may include device drivers 610 that are configured to execute the instructions for generating virtual input devices. The device drivers 610 may be software, an application program, application code, or the like.

The CPU 602 may also be connected through the bus 606 to an input/output (I/O) device interface 612 configured to connect the computing device 600 to one or more I/O devices 614. The I/O devices 614 may include, for example, a keyboard and a pointing device, wherein the pointing device may include a touchpad or a touchscreen, among others. The I/O devices 614 may be built-in components of the computing device 600, or may be devices that are externally connected to the computing device 600. In some examples, the memory 604 may be communicatively coupled to I/O devices 614 through direct memory access (DMA).

The CPU 602 may also be linked through the bus 606 to a display interface 616 configured to connect the computing device 600 to a display device 618. The display device 618 may include a display screen that is a built-in component of the computing device 600. The display device 618 may also include a computer monitor, television, or projector, among others, that is internal to or externally connected to the computing device 600.

The computing device 600 also includes a storage device 620. The storage device 620 is a physical memory such as a hard drive, an optical drive, a thumbdrive, an array of drives, a solid-state drive, or any combinations thereof. The storage device 620 may also include remote storage drives.

The computing device 600 may also include a network interface controller (NIC) 622. The NIC 622 may be configured to connect the computing device 600 through the bus 606 to a network 624. The network 624 may be a wide area network (WAN), local area network (LAN), or the Internet, among others. In some examples, the device may communicate with other devices through a wireless technology. For example, the device may communicate with other devices via a wireless local area network connection. In some examples, the device may connect and communicate with other devices via Bluetooth® or similar technology.

The computing device 600 further includes a depth camera 626. For example, the depth camera may include one or more depth sensors. In some example, the depth camera may include a processor to generate depth information. For example, the depth camera 626 may include functionality such as RealSense™ technology.

The computing device 600 further includes a target object classifier 628. For example, the target object classifier 628 can be used to generate classification scores for a plurality of detected patches in an image. For example, the classification scores may indicate a confidence value that a detected patch corresponds to a target object. For example, the target object may be a human hand. In some examples, the target object classifier 628 may be a pipelined image processor. The target object classifier 628 can include a patch receiver 630, a geometric filter 632, a background remover 634, a classification score calculator 636, a score averager 638, and target object detector 640. In some examples, each of the components 630-640 of the target object classifier 628 may be a microcontroller, embedded processor, or software module. The patch receiver 630 can receive patches with objects to be classified. The geometric filter 632 can filter out patches including objects with sizes outside a target range using three dimensional geometry to generate filtered patches. For example, the target object range may include lower target object bounds and upper target object bounds for a volume and a surface area of a bounding to be calculated for an object in each patch. In some examples, the geometric filter 632 can filter out patches using the method 200 described in FIG. 2 above. The background remover 634 can remove background pixels from the filtered patches to generate preprocessed patches. For example, the background remover 634 may be a convolutional neural network trained to remove background noise. In some examples, the background remover 634 can remove background noise based on an image segmentation using the method 300 described in FIG. 3 above. The classification score calculator 636 can calculate a classification score for each of the preprocessed patches. In some examples, the classification score calculator 636 may be a convolutional neural network trained to classify patches using a set of training images of target objects. The score averager 638 can average classification scores received over a predetermined time for each of the preprocessed patches. For example, the score averager 638 receive a plurality of preprocessed patches with classification scores for a particular object in an image and average the classifications scores for each object. The target object detector 640 can detect a target object in response to detecting a classification score exceeding a threshold score.

The computing device 600 also further includes a virtual target object display 642. In some examples, the virtual target object displayer 642 can display a virtual target object based on preprocessed patch exceeding a threshold classification score. For example, the virtual target object displayer 642 can display target objects detected by the target object detector 640. In some examples, the virtual target object displayer 642 may be used in applications such as integrated hand maneuvering of virtual objects.

The block diagram of FIG. 6 is not intended to indicate that the computing device 600 is to include all of the components shown in FIG. 6. Rather, the computing device 600 can include fewer or additional components not illustrated in FIG. 6, such as additional buffers, additional processors, and the like. The computing device 600 may include any number of additional components not shown in FIG. 6, depending on the details of the specific implementation. Furthermore, any of the functionalities of the CPU 602 may be partially, or entirely, implemented in hardware and/or in a processor. For example, the functionality of the object classifier 628 may be implemented with an application specific integrated circuit, in logic implemented in a processor, in logic implemented in a specialized graphics processing unit such as the GPU 608, or in any other device.

Figure 7:
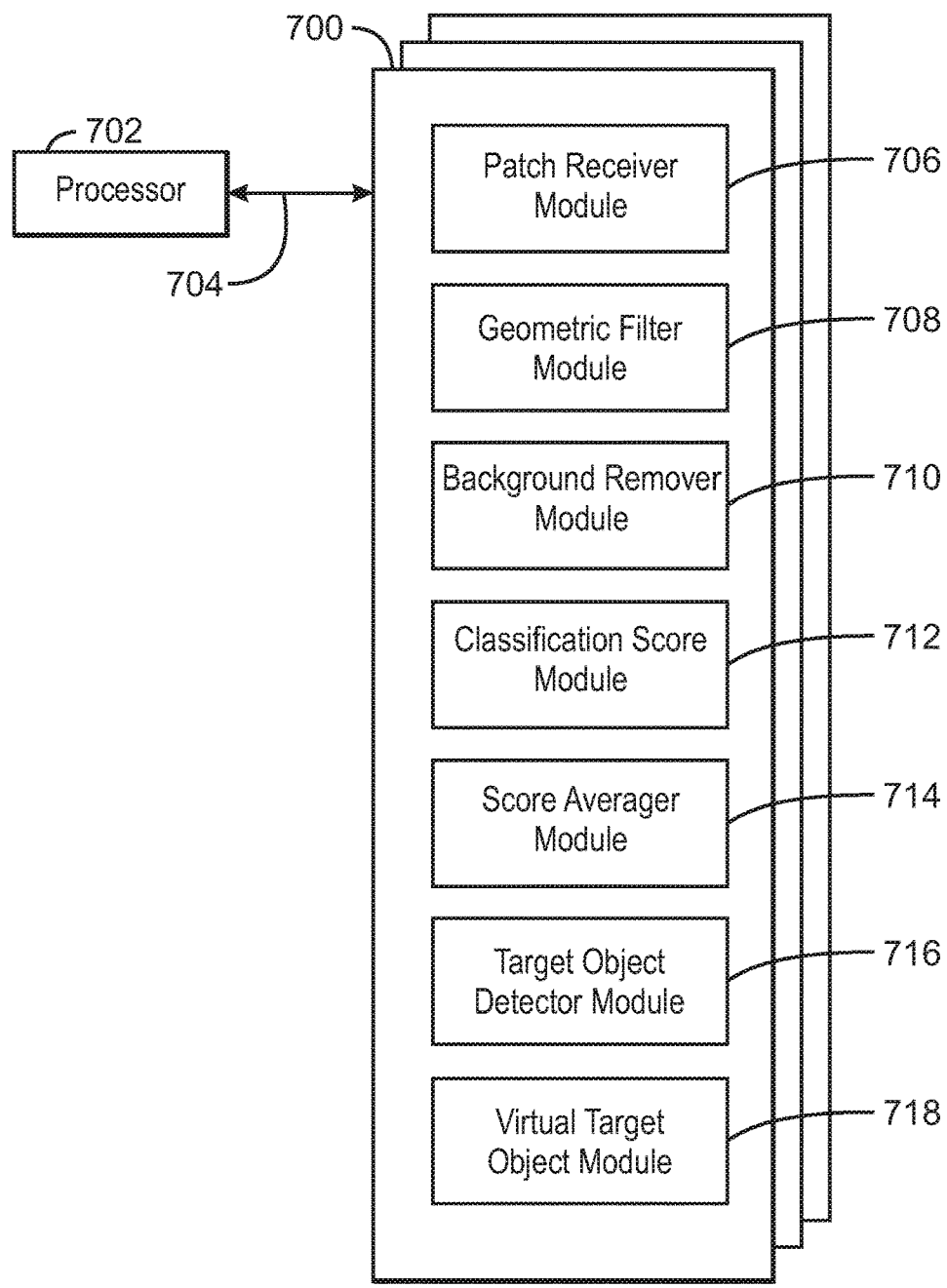
FIG. 7 is a block diagram showing computer readable media that store code for classifying target objects in images using three-dimensional geometric filtering.

FIG. 7 is a block diagram showing computer readable media 700 that store code for classifying target objects in images using three-dimensional geometric filtering. The computer readable media 700 may be accessed by a processor 702 over a computer bus 704. Furthermore, the computer readable medium 700 may include code configured to direct the processor 702 to perform the methods described herein. In some embodiments, the computer readable media 700 may be non-transitory computer readable media. In some examples, the computer readable media 700 may be storage media.

The various software components discussed herein may be stored on one or more computer readable media 700, as indicated in FIG. 7. For example, a patch receiver module 706 may be configured to receive patches with objects to be classified. For example, the patches may include a mask and an infrared image. In some examples, the mask may be generated using a segmentation process. For example, the mask may be generated using the segmentation process descried with respect to FIGS. 5A-5F above. A geometric filter module 708 may be configured to filter out patches including objects with sizes outside a target range using three dimensional geometry to generate filtered patches. In some examples, the geometric filter module 708 may be configured to generate a bounding box for an object in each of the patches and determine whether the bounding box is within a target object range. For example, the geometric filter module 708 may determine whether a volume of the bounding box and a surface area of the bounding box are each within a lower target object bound and an upper target object bound. In some examples, the geometric filter module 708 may use the method 200 above to generate filtered patches. For example, the geometric filter module 708 may determine whether a bounding box volume and a bounding box surface area are within the target object range. In some examples, the geometric filter module 708 may apply smoothing to remove noise when generating dimensions for a bounding box. In some examples, the geometric filter module 708 may calculate a lower bounding box threshold and a higher bounding box threshold based on a plurality of values received from an object database. A background remover module 710 may be configured to remove background pixels from the filtered patches to generate preprocessed patches. For example, the background remover module 710 may be configured to generate a depth masked image for each filtered patch using depth information and remove background noise outside the mask. In some examples, the background remover module 710 may remove background noise using the method 300 of FIG. 3 above. A classification score module 712 may be configured to calculate a classification score indicating a probability that a patch is a target object for each of the preprocessed patches. For example, the target object may be a human hand. A score averager module 714 may be configured to average classification scores received over a predetermined time for each of the preprocessed patches. For example, the score averager module 714 may be configured to receive a plurality of preprocessed patches with classification scores for a particular object in an image and average the classifications scores for each object. A target object detector 716 may be configured to detect a target object in response to detecting an average classification score of a preprocessed patch exceeds a threshold classification score. A virtual target object module 718 may be configured to display a virtual target corresponding to a detected target object in a virtual reality display. For example, the virtual target object module 718 can display the virtual target object in the virtual reality display in real time.

The block diagram of FIG. 7 is not intended to indicate that the computer readable media 700 is to include all of the components shown in FIG. 7. Further, the computer readable media 700 may include any number of additional components not shown in FIG. 7, depending on the details of the specific implementation.

EXAMPLES

Example 1 is an apparatus for classifying target objects using three-dimensional geometric filtering. The apparatus includes a patch receiver to receive an image including patches with objects to be classified. The apparatus also includes a geometric filter to filter out patches including objects with sizes outside a target range using three dimensional geometry to generate filtered patches. The apparatus further includes a background remover to remove background pixels from the filtered patches to generate preprocessed patches. The apparatus also further includes a classification score calculator to calculate a classification score for each of the preprocessed patches.

Example 2 includes the apparatus of example 1, including or excluding optional features. In this example, the apparatus includes a score averager to average classification scores received over a predetermined time for each of the preprocessed patches.

Example 3 includes the apparatus of any one of examples 1 to 2, including or excluding optional features. In this example, the target object includes a human hand.

Example 4 includes the apparatus of any one of examples 1 to 3, including or excluding optional features. In this example, the background remover is to remove background pixels based on an image segmentation.

Example 5 includes the apparatus of any one of examples 1 to 4, including or excluding optional features. In this example, the apparatus includes a target object detector to detect a target object in response to detecting a classification score exceeding a threshold score.

Example 6 includes the apparatus of any one of examples 1 to 5, including or excluding optional features. In this example, the apparatus includes a virtual target object displayer to display a virtual target object based on preprocessed patch exceeding a threshold classification score.

Example 7 includes the apparatus of any one of examples 1 to 6, including or excluding optional features. In this example, the target object range includes lower target object bounds and upper target object bounds for a volume and a surface area of a bounding to be calculated for an object in each patch.

Example 8 includes the apparatus of any one of examples 1 to 7, including or excluding optional features. In this example, the background remover includes a convolutional neural network trained to remove background noise based on a depth image segmentation.

Example 9 includes the apparatus of any one of examples 1 to 8, including or excluding optional features. In this example, the classification score calculator includes a convolutional neural network trained to classify patches using a set of training images of target objects.

Example 10 includes the apparatus of any one of examples 1 to 9, including or excluding optional features. In this example, the apparatus includes a pipelined image processor.

Example 11 is a method for classifying target objects in images. The method includes receiving, via a processor, an image including patches with objects to be classified. The method also includes filtering out, via the processor, patches including objects with sizes outside a target range using three dimensional geometry to generate filtered patches. The method further includes removing, via the processor, background pixels from the filtered patches to generate preprocessed patches. The method also further includes calculating, via the processor, a classification score for each of the preprocessed patches.

Example 12 includes the method of example 11, including or excluding optional features. In this example, the method includes averaging, via the processor, classification scores received over a predetermined time for each of the preprocessed patches.

Example 13 includes the method of any one of examples 11 to 12, including or excluding optional features. In this example, using three dimensional geometry to generate filtered patches includes calculating, via the processor, a bounding box for each patch using a principal component analysis and comparing, via the processor, a volume and a surface area of the bounding box for each patch to a lower bounding box threshold and a higher bounding box threshold.

Example 14 includes the method of any one of examples 11 to 13, including or excluding optional features. In this example, removing the background pixels includes segmenting the image.

Example 15 includes the method of any one of examples 11 to 14, including or excluding optional features. In this example, the method includes detecting a target object based on a classification score exceeding a threshold score.

Example 16 includes the method of any one of examples 11 to 15, including or excluding optional features. In this example, the method includes calculating a lower bounding box threshold and a higher bounding box threshold based on a plurality of values received from an object database.

Example 17 includes the method of any one of examples 11 to 16, including or excluding optional features. In this example, the method includes generating masks using a segmentation process.

Example 18 includes the method of any one of examples 11 to 17, including or excluding optional features. In this example, the patches include a depth image and an infrared image.

Example 19 includes the method of any one of examples 11 to 18, including or excluding optional features. In this example, filtering out, via the processor, the patches including the objects with sizes outside the target range using three dimensional geometry noise includes applying smoothing to remove noise when generating dimensions for a bounding box.

Example 20 includes the method of any one of examples 11 to 19, including or excluding optional features. In this example, the objects include hands.

Example 21 is at least one computer readable medium for classifying target objects using three-dimensional geometric filtering having instructions stored therein that. The computer-readable medium includes instructions that direct the processor to receive an image including patches with objects to be classified. The computer-readable medium also includes instructions that direct the processor to filter out patches including objects with sizes outside a target range using three dimensional geometry to generate filtered patches. The computer-readable medium further includes instructions that direct the processor to remove background pixels from the filtered patches using image segmentation to generate preprocessed patches. The computer-readable medium includes instructions that direct the processor to calculate a classification score indicating a probability that a patch is a target object for each of the preprocessed patches.

Example 22 includes the computer-readable medium of example 21, including or excluding optional features. In this example, the computer-readable medium includes instructions to average classification scores received over a predetermined time for each of the preprocessed patches.

Example 23 includes the computer-readable medium of any one of examples 21 to 22, including or excluding optional features. In this example, the computer-readable medium includes instructions to detect a target object in response to detecting an average classification score of a preprocessed patch exceeds a threshold classification score.

Example 24 includes the computer-readable medium of any one of examples 21 to 23, including or excluding optional features. In this example, the computer-readable medium includes instructions to display a virtual target corresponding to a detected target object in a virtual reality display.

Example 25 includes the computer-readable medium of any one of examples 21 to 24, including or excluding optional features. In this example, the target object includes a human hand.

Example 26 includes the computer-readable medium of any one of examples 21 to 25, including or excluding optional features. In this example, the computer-readable medium includes instructions to calculate a lower bounding box threshold and a higher bounding box threshold based on a plurality of values received from an object database.

Example 27 includes the computer-readable medium of any one of examples 21 to 26, including or excluding optional features. In this example, the patches include a depth image and an infrared image.

Example 28 includes the computer-readable medium of any one of examples 21 to 27, including or excluding optional features. In this example, the computer-readable medium includes instructions to determine whether a bounding box volume and a bounding box surface area are within the target object range.

Example 29 includes the computer-readable medium of any one of examples 21 to 28, including or excluding optional features. In this example, the computer-readable medium includes instructions to generate a mask using a segmentation process.

Example 30 includes the computer-readable medium of any one of examples 21 to 29, including or excluding optional features. In this example, the computer-readable medium includes instructions to apply smoothing to remove noise when generating dimensions for a bounding box.

Example 31 is a system for classifying target objects using three-dimensional geometric filtering. The system includes a patch receiver to receive an image including patches with objects to be classified. The system also includes a geometric filter to filter out patches including objects with sizes outside a target range using three dimensional geometry to generate filtered patches. The system further includes a background remover to remove background pixels from the filtered patches to generate preprocessed patches. The system also further includes a classification score calculator to calculate a classification score for each of the preprocessed patches.

Example 32 includes the system of example 31, including or excluding optional features. In this example, the system includes a score averager to average classification scores received over a predetermined time for each of the preprocessed patches.

Example 33 includes the system of any one of examples 31 to 32, including or excluding optional features. In this example, the target object includes a human hand.

Example 34 includes the system of any one of examples 31 to 33, including or excluding optional features. In this example, the background remover is to remove background pixels based on an image segmentation.

Example 35 includes the system of any one of examples 31 to 34, including or excluding optional features. In this example, the system includes a target object detector to detect a target object in response to detecting a classification score exceeding a threshold score.

Example 36 includes the system of any one of examples 31 to 35, including or excluding optional features. In this example, the system includes a virtual target object displayer to display a virtual target object based on preprocessed patch exceeding a threshold classification score.

Example 37 includes the system of any one of examples 31 to 36, including or excluding optional features. In this example, the target object range includes lower target object bounds and upper target object bounds for a volume and a surface area of a bounding to be calculated for an object in each patch.

Example 38 includes the system of any one of examples 31 to 37, including or excluding optional features. In this example, the background remover includes a convolutional neural network trained to remove background noise based on a depth image segmentation.

Example 39 includes the system of any one of examples 31 to 38, including or excluding optional features. In this example, the classification score calculator includes a convolutional neural network trained to classify patches using a set of training images of target objects.

Example 40 includes the system of any one of examples 31 to 39, including or excluding optional features. In this example, the system includes a pipelined image processor.

Example 41 is a system for classifying target objects using three-dimensional geometric filtering. The system includes means for receiving an image including patches with objects to be classified. The system also includes means for filtering out patches including objects with sizes outside a target range using three dimensional geometry to generate filtered patches. The system further includes means for removing background pixels from the filtered patches to generate preprocessed patches. The system also further includes means for calculating a classification score for each of the preprocessed patches.

Example 42 includes the system of example 41, including or excluding optional features. In this example, the system includes means for averaging classification scores received over a predetermined time for each of the preprocessed patches.

Example 43 includes the system of any one of examples 41 to 42, including or excluding optional features. In this example, the target object includes a human hand.

Example 44 includes the system of any one of examples 41 to 43, including or excluding optional features. In this example, the means for removing background pixels is to remove background pixels based on an image segmentation.

Example 45 includes the system of any one of examples 41 to 44, including or excluding optional features. In this example, the system includes a target object detector to detect a target object in response to detecting a classification score exceeding a threshold score.

Example 46 includes the system of any one of examples 41 to 45, including or excluding optional features. In this example, the system includes means for displaying a virtual target object based on preprocessed patch exceeding a threshold classification score.

Example 47 includes the system of any one of examples 41 to 46, including or excluding optional features. In this example, the target object range includes lower target object bounds and upper target object bounds for a volume and a surface area of a bounding to be calculated for an object in each patch.

Example 48 includes the system of any one of examples 41 to 47, including or excluding optional features. In this example, the background remover includes a convolutional neural network trained to remove background noise based on a depth image segmentation.

Example 49 includes the system of any one of examples 41 to 48, including or excluding optional features. In this example, the classification score calculator includes a convolutional neural network trained to classify patches using a set of training images of target objects.

Example 50 includes the system of any one of examples 41 to 49, including or excluding optional features. In this example, the system includes a pipelined image processor.

Not all components, features, structures, characteristics, etc. described and illustrated herein need be included in a particular aspect or aspects. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some aspects have been described in reference to particular implementations, other implementations are possible according to some aspects. Additionally, the arrangement and/or order of circuit elements or other features illustrated in the drawings and/or described herein need not be arranged in the particular way illustrated and described. Many other arrangements are possible according to some aspects.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

It is to be understood that specifics in the aforementioned examples may be used anywhere in one or more aspects. For instance, all optional features of the computing device described above may also be implemented with respect to either of the methods or the computer-readable medium described herein. Furthermore, although flow diagrams and/or state diagrams may have been used herein to describe aspects, the techniques are not limited to those diagrams or to corresponding descriptions herein. For example, flow need not move through each illustrated box or state or in exactly the same order as illustrated and described herein.

The present techniques are not restricted to the particular details listed herein. Indeed, those skilled in the art having the benefit of this disclosure will appreciate that many other variations from the foregoing description and drawings may be made within the scope of the present techniques. Accordingly, it is the following claims including any amendments thereto that define the scope of the present techniques.

What is claimed is:

1. An apparatus for classifying target objects using three-dimensional geometric filtering, comprising:
    a patch receiver to receive patches with objects to be classified;
    a geometric filter to filter out patches corresponding to objects with sizes outside a target range of object sizes using three dimensional geometry to generate filtered patches;
    a background remover to remove background pixels from the filtered patches to generate preprocessed patches without the removed background pixels;
    a classification score calculator to calculate a classification score for each of the preprocessed patches;
    a target object detector to detect a target object in response to detecting a classification score exceeding a threshold score; and
    a virtual target object displayer to display the detected target object as a virtual target object in a virtual reality display in real time.

2. The apparatus of claim 1, comprising a score averager to average classification scores received over a predetermined time for each of the preprocessed patches.

3. The apparatus of claim 1, wherein the target object comprises a human hand.

4. The apparatus of claim 1, wherein the background remover is to remove background pixels based on an image segmentation.

5. The apparatus of claim 1, wherein the target object range comprises lower target object bounds and upper target object bounds for a volume and a surface area of a bounding to be calculated for an object in each patch.

6. The apparatus of claim 1, wherein the background remover comprises a convolutional neural network trained to remove background noise based on a depth image segmentation.

7. The apparatus of claim 1, wherein the classification score calculator comprises a convolutional neural network trained to classify patches using a set of training images of target objects.

8. The apparatus of claim 1, wherein the apparatus comprises a pipelined image processor.

9. A method for classifying target objects in images, comprising:
    receiving, via a processor, patches with objects to be classified;
    filtering out, via the processor, patches corresponding to objects with sizes outside a target range using three dimensional geometry to generate filtered patches;
    removing, via the processor, background pixels from the filtered patches to generate preprocessed patches without the removed background pixels;
    calculating, via the processor, a classification score for each of the preprocessed patches;
    detecting, via the processor, a target object in response to detecting a classification score exceeding a threshold score; and
    displaying, via the processor, the detected target object as a virtual target object in a virtual reality display in real time.

10. The method of claim 9, comprising averaging, via the processor, classification scores received over a predetermined time for each of the preprocessed patches.

11. The method of claim 9, wherein using three dimensional geometry to generate filtered patches comprises calculating, via the processor, a bounding box for each patch using a principal component analysis and comparing, via the processor, a volume and a surface area of the bounding box for each patch to a lower bounding box threshold and a higher bounding box threshold.

12. The method of claim 9, wherein removing the background pixels comprises segmenting the image.

13. At least one computer readable medium for classifying target objects using three-dimensional geometric filtering having instructions stored therein that, in response to being executed on a computing device, cause the computing device to:
- receive patches with objects to be classified;
- filter out patches corresponding to objects with sizes outside a target range of object sizes using three dimensional geometry to generate filtered patches;
- remove background pixels from the filtered patches using image segmentation to generate preprocessed patches without the removed background pixels;
- calculate a classification score indicating a probability that a patch is a target object for each of the preprocessed patches;
- detect a target object in response to detecting a classification score exceeding a threshold score; and
- display the detected target object as a virtual target object in a virtual reality display in real time.

14. The at least one computer readable medium of claim 13, comprising instructions to average classification scores received over a predetermined time for each of the preprocessed patches.

15. The at least one computer readable medium of claim 13, comprising instructions to detect a target object in response to detecting an average classification score of a preprocessed patch exceeds a threshold classification score.

16. The at least one computer readable medium of claim 13, wherein the target object comprises a human hand.

* * * * *